Feb. 4, 1958  J. M. CARGILL ET AL  2,821,783
GAGES
Filed July 20, 1954  3 Sheets-Sheet 1

INVENTOR.
Jeffrey M. Cargill
Hugh M. Taft
BY Martin Kirkpatrick
Atty

Feb. 4, 1958  J. M. CARGILL ET AL  2,821,783
GAGES

Filed July 20, 1954  3 Sheets-Sheet 2

INVENTOR.
Jeffrey M. Cargill
BY

Feb. 4, 1958

J. M. CARGILL ET AL 2,821,783

GAGES

Filed July 20, 1954

INVENTOR.
Jeffrey M. Cargill
BY Dwight W. Taft
Martin Kirkpatrick
Atty

United States Patent Office 2,821,783
Patented Feb. 4, 1958

2,821,783

GAGES

Jeffrey M. Cargill, Weathersfield Bow, and Hugh M. Taft, Springfield, Vt., assignors to Bryant Chucking Grinder Company, Springfield, Vt., a corporation of Vermont Application July 20, 1954, Serial No. 444,414

8 Claims. (Cl. 33—148)

This invention relates to gages for workpieces and particularly to gages for the gaging of threaded workpieces. It has for an object to provide a relatively simple gage especially useful for the accurate gaging by unskilled persons of large numbers of identical threaded workpieces, and yet at the same time one which may readily be adapted for the gaging of workpieces of different sizes and configurations.

It is a feature of the novel gage of the invention that it may be positively maintained in either gaging or non-gaging position, thus allowing an operator the use of both hands in the placing or the removal of a workpiece on the gage or while the workpiece is in gaging position on the gage.

Another feature of the novel gage of the invention is its ready adaption to either internal or external gaging, each of which requires a different direction of gage element movement, an internal gage being opened into gaging position and an external gage being closed into gaging position. Heretofore, a separate gage has commonly been used for each type of gaging, but by a simple adjustment of the gage element structure of the novel gage of the invention, it may be quickly altered from an internal to an external gage, or vice versa. Furthermore, such reversal requires no critical adjustment of the gage other than the usual setting to a standard workpiece and thus may be performed by relatively unskilled gage operators.

Other objects and features of the invention will be apparent from the following description of a preferred embodiment thereof together with the accompanying drawings, in which.

Figure 1:
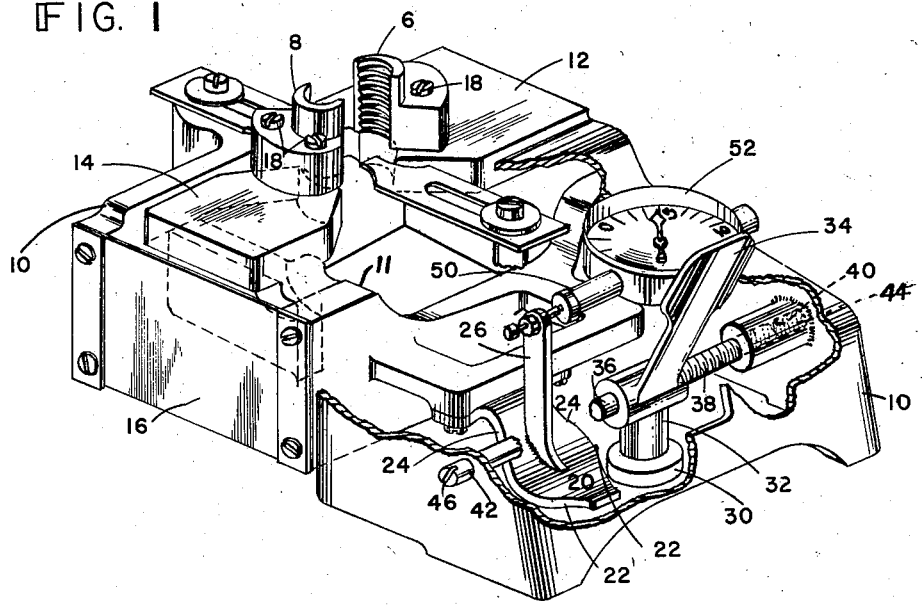
Fig. 1 is an isometric view of a gage of the invention arranged as an external gage.
Figure 2:
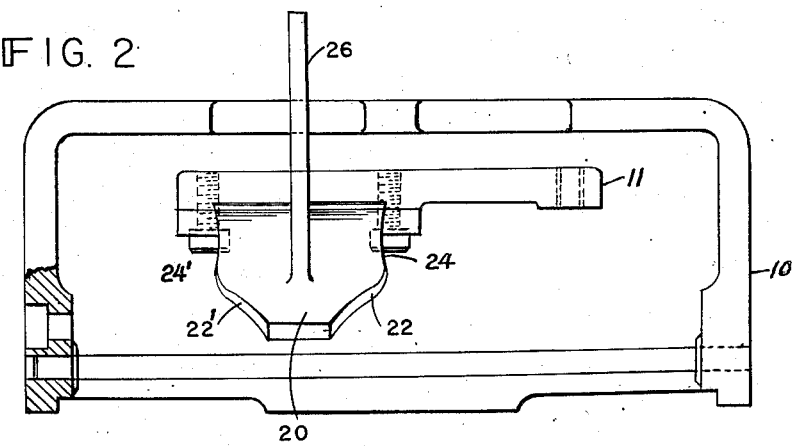
Fig. 2 is a front elevational view, partly broken away, of the gage of Fig. 1.
Figure 3:
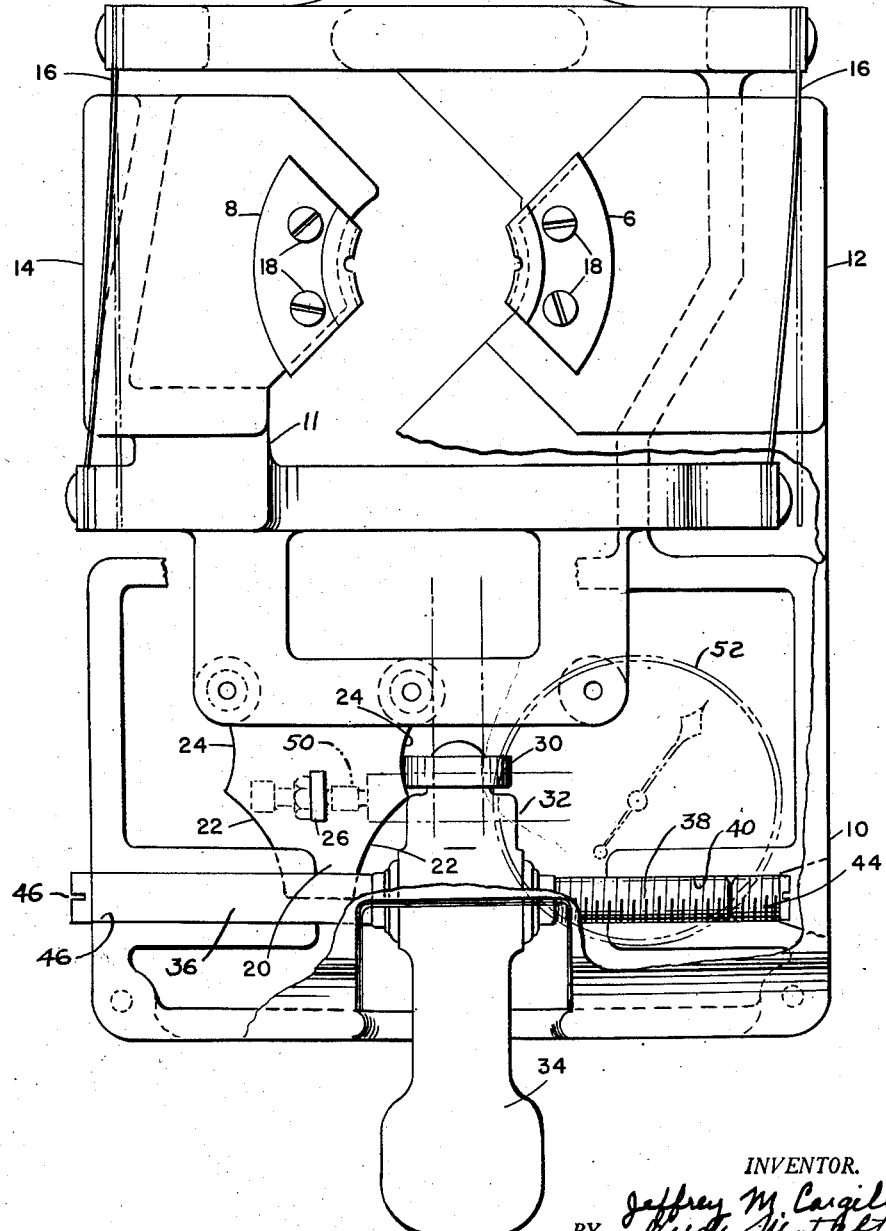
Fig. 3 is a plan view of the gage of Fig. 1, with a portion thereof broken away.

Referring to Figs. 1, 2 and 3, the gage of this invention includes a main fixed frame 10 and a movable sub frame 11, each carrying a gage element supporting member and being connected together by a pair of spaced parallel reeds 16 for relative movement. Each of the reeds 16 is secured at one end to the main fixed frame 10 and at the other end to the movable subframe 11, and extend generally along said frame 10 on opposite sides thereof. The reeds 16 are of substantial width, thus to provide a rigid and secure structure affording substantial resistance to relative motion of the members in a direction parallel to the plane of the reeds, but permitting the members to be moved relatively to one another in either direction from their neutral or rest position in a single plane perpendicular to that of the reeds, and in a substantially rectilinear direction. Said reeds 16 act as the sole support for said movable frame 11 and also as the sole means to urge said supporting members into gaging position, such gaging position normally being slightly displaced from the neutral position of the reeds, on either side of said neutral position, to provide the requisite gaging pressure.

On the upper portions of the fixed frame 10 and movable subframe 11 are provided gage element supporting members 12 and 14, respectively, such members having relatively flat upper surfaces adapted to support suitable gage elements 6 and 8, said gage elements being mounted on said members by machine screws 18 fitting into tapped holes in said support members. Since the gage shown in Figs. 1 through 3 is intended for external thread gaging, gage elements 6 and 8 have their shank portions internally threaded for gaging engagement with the external threads of a workpiece. Other gage elements may readily be substituted by the removal of screws 18.

The movable subframe 11 carrying gage element supporting member 14 is provided with camming means carried thereby and interposed between said movable subframe 11 and frame 10 to urge the gage elements 6 and 8 mounted on the supporting members into non-gaging position substantially displaced from the neutral position of the reeds 16, and to retain them in such position until released. Such camming means includes a curved cam member 20 mounted on movable supporting member 14 and having on each side thereof opposed cam surfaces 22 and 22' slanted outwardly and rearwardly away from the center line of said cam, and a cam follower in the form of a roller 30 mounted on one end of a pivoted lever 32 having at its other end an operating key 34. The lever 32 is pivoted in lateral adjustably fixed position on a shaft 36 mounted on gage frame 10 so that roller 30 may be swung, by downward movement of said key, about shaft 36 as an axis to cooperate with one of said rearwardly and outwardly displaced cam surfaces 22 and 22', urging curved cam 20 in a sideways direction to open gage elements 6 and 8 into non-gaging position, such cam 20 being curved radially with respect to shaft 36 so that roller 30 will continue to contact a cam surface during its travel.

Shaft 36 has a threaded end portion 38 fitting into a threaded bore 40 on one side of frame 10, its other end fitting into a smooth bore 42 on the opposite side of said frame so that the position of lever 32 with its roller 30 may be adjusted sideways by rotating shaft 36 through its adjusting slot 46 so as to engage either side of cam 20 to reverse the direction of relative movement of frame 10 and subframe 11 as urged by said cam 20, all as hereinafter more fully explained, a set screw 44 being maintained in said threaded bore 40 to maintain shaft 36 fixed in its adjusted position.

Preferably, in order to lock gage elements 6 and 8 in non-gaging position, additional cam surfaces 24 and 24' are provided on opposite sides of said cam 20, said additional surfaces being positioned rearwardly of cam surfaces 22 and extending slightly rearwardly and inwardly from the rearward end of said cam surfaces 22 and 22' to provide a lock by means of the spring tension of reeds 16, so that said gage elements 6 and 8 may be locked in non-gaging position by fully depressing key 34 to move roller 30 onto a cam surface 24 or 24', and will be maintained in such position.

A vertically extending arm 26 is also provided on cam 20 to engage with the actuating stem 50 of a dial indicator 52 mounted on main frame 10, so that said dial indicator will be responsive to relative movement between sub frame 11 and main frame 10. Release of the gage elements 6 and 8 may be readily accomplished by pressing operating key 34 upward until roller 30 passes forwardly and downwardly onto a cam surface 22 or 22' and then clear of said cam surface, after which reeds 16 will urge the gaging elements together into gaging position.

To use the gage of Figs. 1 through 3, it is first set in non-gaging position with cam roller 30 in contact with a cam surface 24 to lock the external gage elements in their open non-gaging position with reeds 16 substantially displaced from their neutral position with sub frame 11 in a position displaced to the left (Fig. 3) of main frame 10, and there positively maintain them to provide clearance for the threads of a workpiece which may then be inserted into the gage elements 6 and 8. With the workpiece in position, the gage may be release to closed gaging position by pressing upward on operating key 34. This will move roller 30 from the gage locking cam surface 24 onto cam surface 22 and then clear of such cam surface, whereupon the gage elements 6 and 8 will move relatively toward one another and into closed gaging position in contact with the workpiece as urged by reeds 16 with the reeds slightly displaced from their neutral position with subframe 11 in a position but slightly displaced to the left (Fig. 3) of main frame 10. Thus, the reeds 16 provide the sole gaging pressure, being fixed into a position between their further displaced non-gaging position and their neutral position so that gage elements 6 and 8 remain positively maintained in gaging position.

The indicator actuating stem 50 will then be engaged with arm 26 on cam 20 of movable supporting member 14 to give a reading on indicator 52, it being assumed that the gage has been previously set to a standard plug in the usual manner. After the deviation from standard diameter has thus been determined, key 34 is pressed downwardly to move roller 30 rearwardly along cam surface 22 to urge cam 20 sideways to move the gaging elements from gaging into non-gaging position again.

Figure 4:
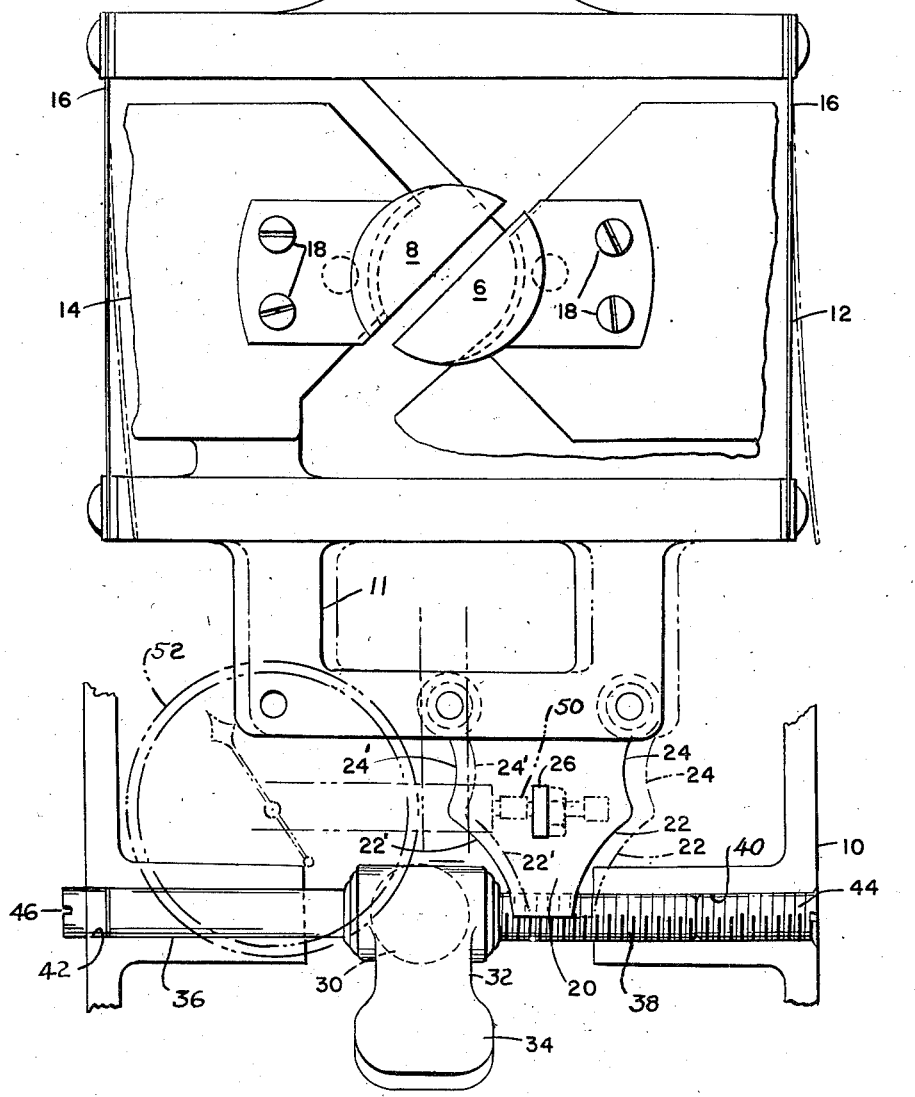
Fig. 4 is a plan view, partly broken away, of the gage of Fig. 1 arranged as an internal gage.

In Fig. 4 is shown the gage of Figs. 1 through 3 with the roller 30 in adjusted position on the other side of cam 20 to provide an internal gage, as by laterally repositioning cam member 20 on movable subframe 11. For such a gage, suitable internal gage elements 6' and 8' are mounted on supporting members 12 and 14 and the shaft 36 adjusted laterally so that roller 30 is fixed in position to engage cam surfaces 22' and 24' to urge cam 20 in the opposite direction from that above described. The reversal of the roller 30 will result in the movable subframe 11 also being moved in the opposite direction to the right in Fig. 4, also displacing the reeds 16 in the opposite direction, so that depressing operating key 30 will close the gaging elements 6' and 8' into non-gaging position with reeds 16 substantially displaced from their neutral position. The actuating stem 50 of dial indicator 52 will also be operated in either position by means of the arm 26 positioned centrally of cam 20.

In the operation of the internal gage configuration of Fig. 4, the downward movement of actuating key 34 closes the gage elements 6' and 8' into non-gaging position with the reeds 16 substantially displaced from their neutral position, so that a workpiece may be placed around them. Upward movement of actuating key 34 will then allow the gage elements 6' and 8' to move away from one another into gaging position by virtue of the spring action of reeds 16, with the reeds being slightly displaced to the right (Fig. 4) of their neutral position when gaging elements 6 and 8 contact the workpiece, to provide the requisite gaging pressure, the indicator 50 being actuated by arm 26 as before. Then by pressing key 34 the gage elements 6' and 8' will be returned to closed non-gaging position so that the workpiece can be removed.

As a modification of our invention, an additional spring means may be used if desired to provide the requisite gaging pressure, and with such structure the reeds may be in their neutral position when gaging, although displaced when in a non-gaging position, and said additional spring will thus act with the reeds for at least the initial portion of their travel to move the gage elements from non-gaging to gaging position.

Thus it will be seen that the invention provides a surprisingly simple yet universal gage readily used by unskilled persons for the accurate gaging of workpieces. It will be apparent to those skilled in the gage art that various modifications not herein disclosed may be made in the novel gage within the spirit of our invention and the scope of the appended claims.

We claim:

1. A gage comprising a pair of gage element supporting members, gage elements on each of said supporting members, a pair of reeds arranged in parallel relation, one end of each of said reeds being secured to one end of each of said members, said reeds forming the sole means for supporting one of said members to provide yielding substantially rectilinear motion relative to the other of said members to open and closed positions of said gage elements and to provide gaging pressure on said gage elements, means interposed between said supporting members for displacing said supporting members from gaging position with said reeds slightly displaced from a neutral position in one direction to non-gaging position with said reeds further displaced in the same direction, means for selectively positioning said means interposed between said supporting members to move said supporting members in opposite directions from a neutral point to reverse the direction of movement from gaging to non-gaging position of said supporting members, and indicating means responsive to the relative displacement of said supporting members.

2. A gage comprising a pair of gage element supporting members, gage elements on each of said supporting members, a pair of reeds arranged in parallel relation, one end of each of said reeds being secured to one end of each of said members, said reeds forming the sole means for supporting one of said members to provide yielding substantially rectilinear motion relative to the other of said members to open and closed positions of said gage elements and to provide gaging pressure on said gage elements, means interposed between said supporting members for displacing said supporting members from gaging position with said reeds slightly displaced from a neutral position in one direction to non-gaging position with said reeds further displaced in the same direction and for releasably maintaining said supporting members in said further displaced position against the yielding action of said reeds, means for selectively positioning said means interposed between said supporting members to move said supporting members in opposite directions from a neutral point to reverse the direction of movement from gaging to non-gaging position of said supporting members, and indicating means responsive to the relative displacement of said supporting members.

3. A gage comprising a frame, a pair of gage element supporting members mounted on said frame, one of said supporting members being maintained in fixed position relative to said frame and the other maintained in movable position relative to said frame, gage elements on each of said supporting members, a pair of reeds arranged in parallel relation, one end of each of said reeds being secured to one end of each of said members, said reeds supporting one of said members for yielding substantially rectilinear motion relative to the other of said members in a direction to move said gage elements toward and away from one another to open and close said gage elements, camming means interposed between said supporting members, said means including a cam surface curved about an axis and mounted on said movable support member and a cam follower pivotally mounted on said frame for swinging movement about said axis to engage said surface to urge said movable support member into non-gaging position relatively to said fixed support member and operating means for moving said cam surface and cam follower relatively to one another to progressively displace said movable supporting member relative to said fixed supporting member into non-gaging position, and indicating means mounted on said frame responsive to the relative displacement of said supporting members.

4. A gage as claimed in claim 3 in which said camming means further includes lever means for pivoting said cam follower to swing it about said axis along said cam surface.

5. A gage comprising a frame, a pair of gage element supporting members mounted on said frame, one of said supporting members being maintained in fixed posiiton relative to said frame and the other maintained in movable position relative to said frame, gage elements on each of said supporting members, a pair of reeds arranged in parallel relation, one end of each of said reeds being secured to one end of each of said members, said reeds supporting one of said members for yielding substantially rectilinear motion relative to the other of said members in a direction to move said gage elements toward and away from one another to open and close said gage elements and to urge said supporting members into gaging position, camming means interposed between said supporting members, said means including a cam having a first cam surface slanted in one direction and a second cam surface slanted in the other direction, a cam follower movable along said surfaces relatively thereto initially engaging said first cam surface to displace said movable support member into non-gaging position and subsequently engaging said second cam surface releasably to maintain said movable supporting member in non-gaging position, and operating means for moving said cam surfaces and cam follower relatively to one another to first progressively displace said movable supporting member relative to said fixed supporting member into non-gaging position and subsequently releasably to maintain said supporting member in non-gaging position, and indicating means mounted on said frame responsive to the relative displacement of said supporting members.

6. A gage comprising a frame, a pair of gage element supporting members mounted on said frame, one of said supporting members being maintained in fixed position relative to said frame and the other maintained in movable position relative to said frame, gage elements on each of said supporting members, a pair of reeds arranged in parallel relation, one end of each of said reeds being secured to one end of each of said members, said reeds supporting one of said members for yielding substantially rectilinear motion relative to the other of said members in a direction to move said gage elements toward and away from one another to open and close said gage elements and to urge said supporting members into gaging position, camming means interposed between said supporting members, said means including a pair of opposed cams, a cam follower, means for selectively positioning said cam follower to cooperate with one only of said cam surfaces, and operating means for moving said cooperating cam and cam follower relative to one another to displace said movable supporting member relative to said fixed supporting member into non-gaging position, and indicating means mounted on said frame responsive to the relative displacement of said supporting members.

7. A gage as claimed in claim 2, in which said displacing means further includes a curved cam member mounted on said movable supporting member, said cam member having opposed surfaces slanting rearwardly away from one another, and a cam follower pivotally mounted on said frame in a first adjustable position selectively to engage a first one only of said cam surfaces and in a second adjustable position to engage a second one only of said cam surfaces, whereby said gage may be selectively adjusted for internal or external gaging.

8. A gage comprising a frame, a pair of gage element supporting members mounted on said frame, one of said supporting members being maintained in fixed position relative to said frame and the other maintained in movable position relative to said frame, gage elements on each of said supporting members, a pair of reeds arranged in parallel relation, one end of each of said reeds being secured to the other of said members, said reeds supporting one of said members for yielding substantially rectilinear motion relative to the other of said members in a direction to move said gage elements toward and away from one another to open and close said gage elements and to urge said supporting members into gaging position, camming means interposed between said supporting members, said means including a pair of opposed cams, a cam follower, means for selectively positioning said cam follower to cooperate with one only of said cam surfaces, and operating means for moving said cooperating cam and cam follower relatively to one another to displace said movable supporting member relative to said fixed supporting member into non-gaging position and releasably to maintain said supporting members in non-gaging position, and indicating means mounted on said frame responsive to the relative displacement of said supporting members.

References Cited in the file of this patent

UNITED STATES PATENTS

| | | |
|---|---|---|
| 1,625,462 | Frauenthal | Apr. 19, 1927 |
| 2,197,198 | Street | Apr. 16, 1940 |
| 2,258,760 | Hecker | Oct. 14, 1941 |
| 2,538,295 | Cornell | Jan. 16, 1951 |
| 2,581,946 | Duesler | Jan. 8, 1952 |
| 2,588,820 | Gates et al. | Mar. 11, 1952 |